July 16, 1935. E. G. STAUDE 2,008,049
SHEET FEEDING, FOLDING AND GLUING MECHANISM
Filed Oct. 4, 1934 14 Sheets-Sheet 2

INVENTOR
EDWIN G. STAUDE
BY Paul Paul Moore
ATTORNEYS

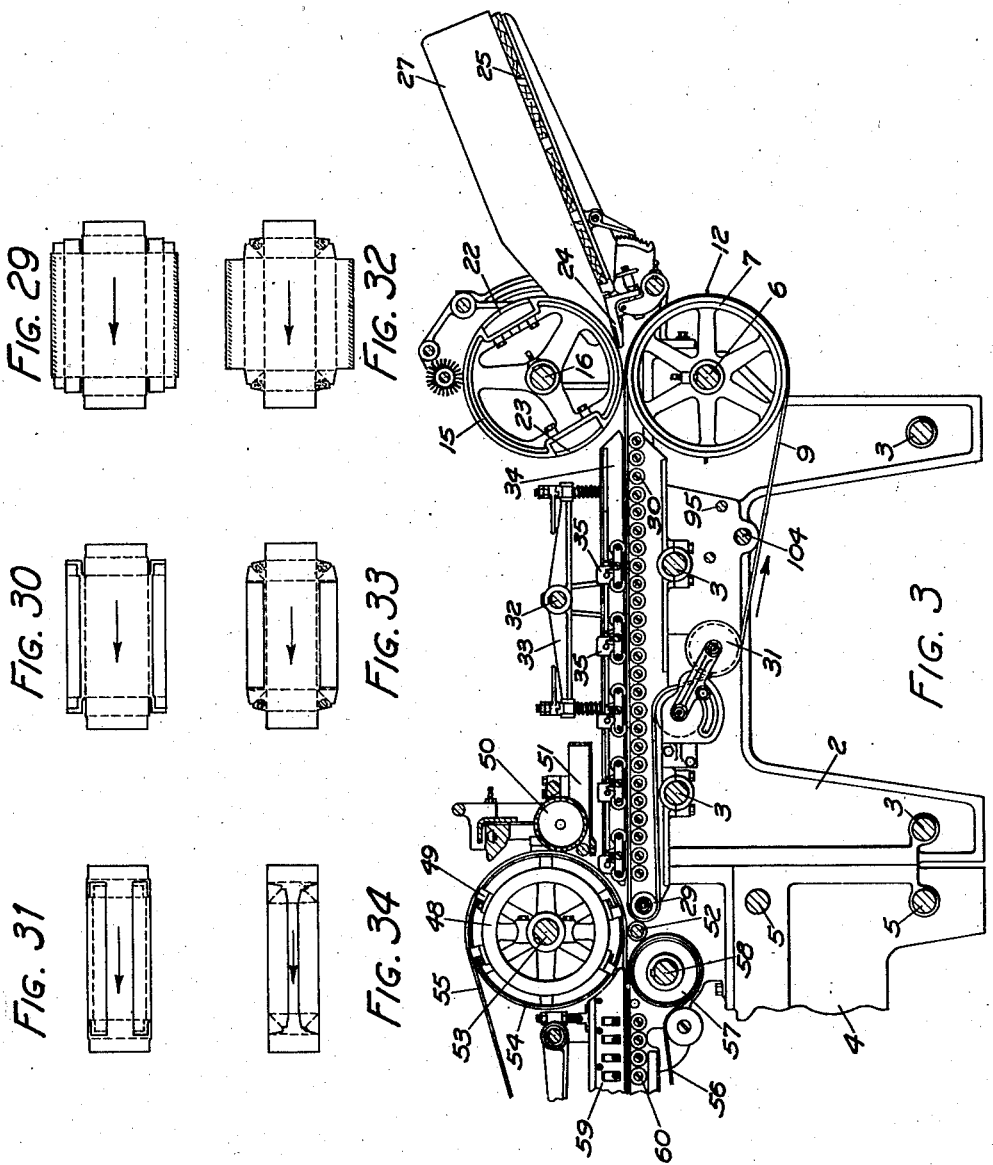

July 16, 1935. E. G. STAUDE 2,008,049
SHEET FEEDING, FOLDING AND GLUING MECHANISM
Filed Oct. 4, 1934  14 Sheets-Sheet 4
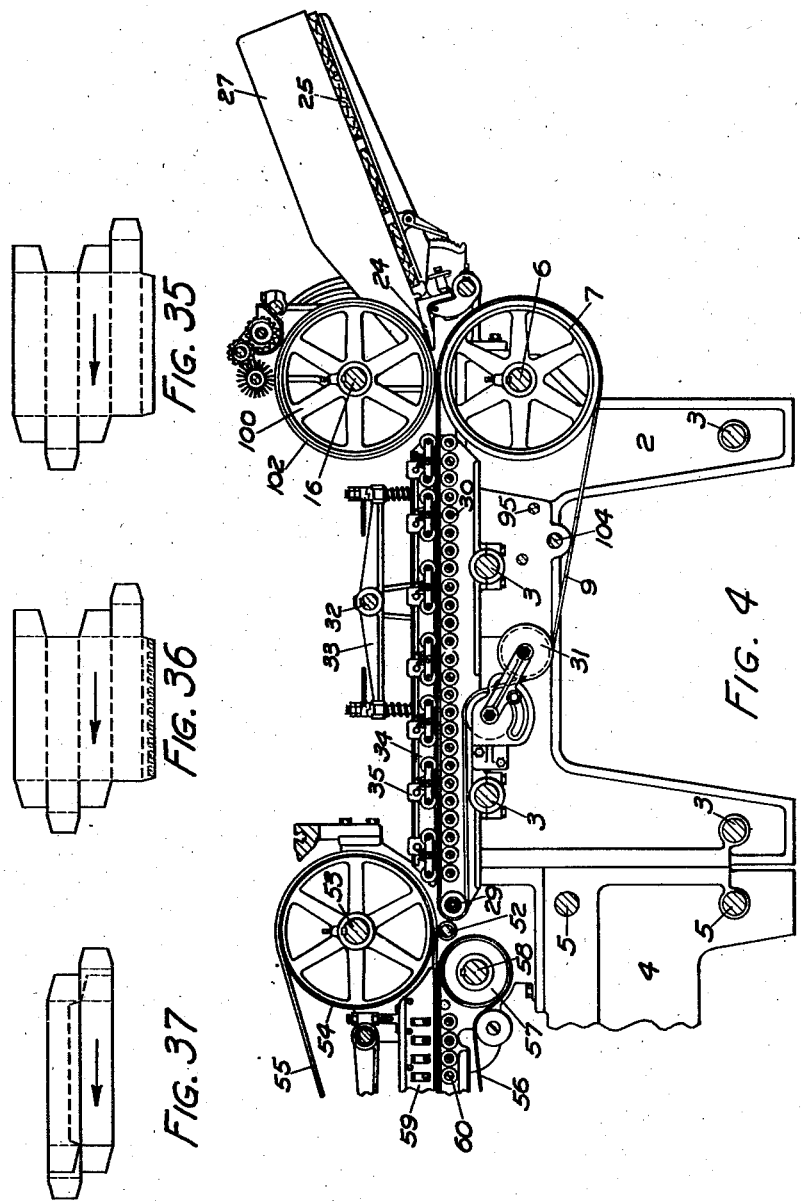
INVENTOR
EDWIN G. STAUDE
ATTORNEYS July 16, 1935.  E. G. STAUDE  2,008,049
SHEET FEEDING, FOLDING AND GLUING MECHANISM
Filed Oct. 4, 1934  14 Sheets-Sheet 5

INVENTOR
EDWIN G. STAUDE
BY Paul, Paul & Moore
ATTORNEYS

July 16, 1935. E. G. STAUDE 2,008,049
SHEET FEEDING, FOLDING AND GLUING MECHANISM
Filed Oct. 4, 1934 14 Sheets-Sheet 7

INVENTOR
EDWIN G. STAUDE
BY Paul, Paul H Moore
ATTORNEYS

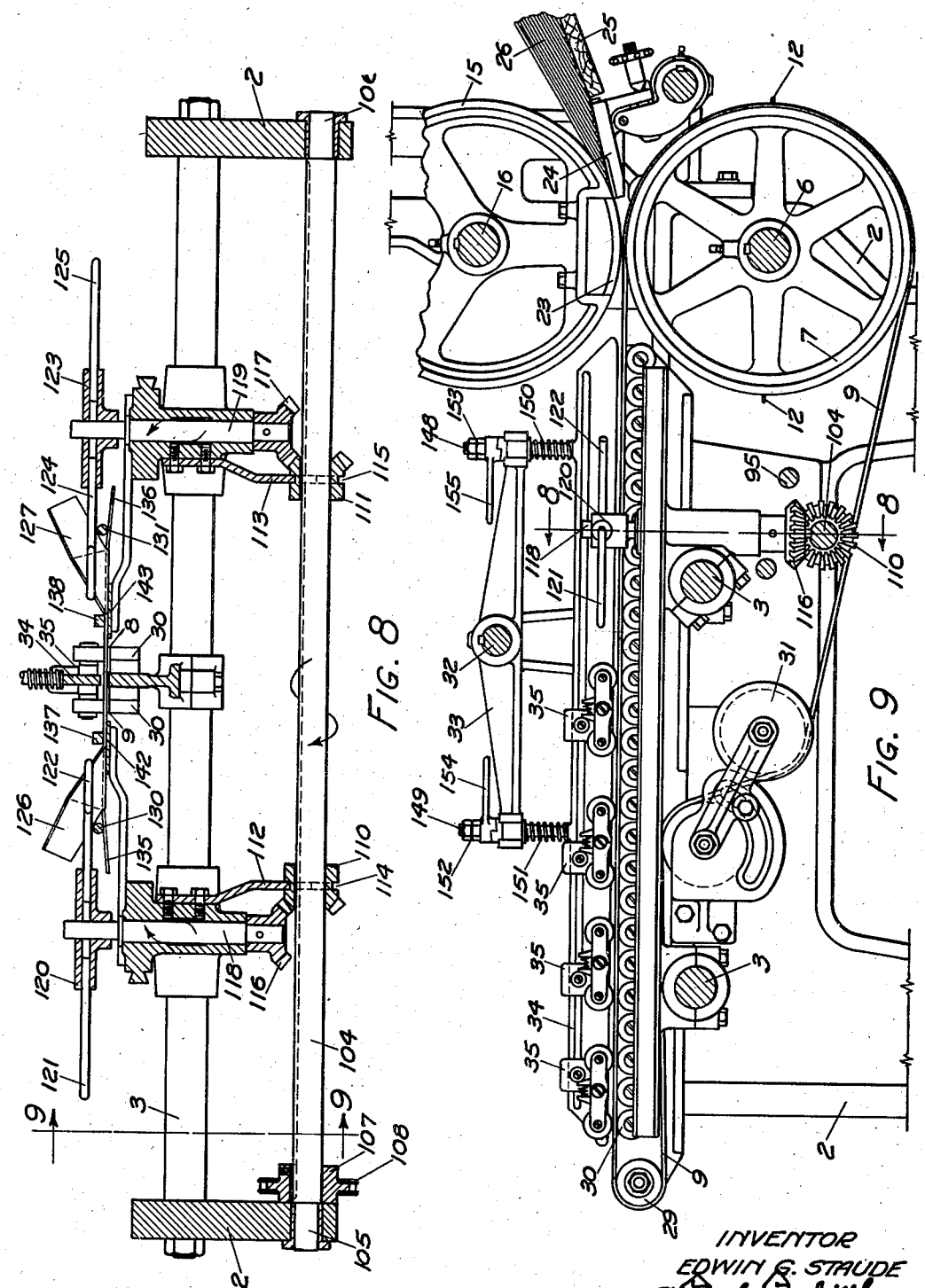

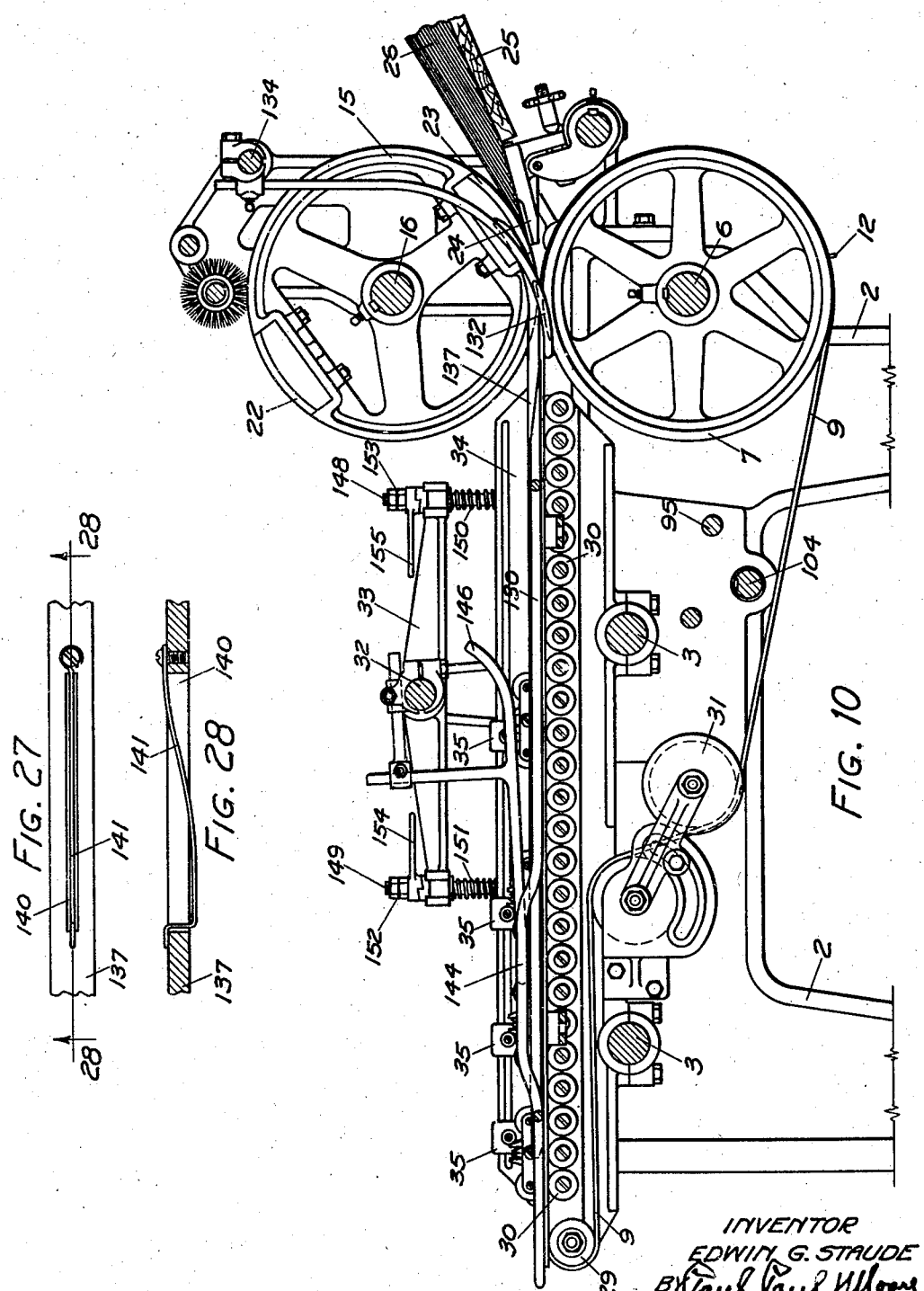

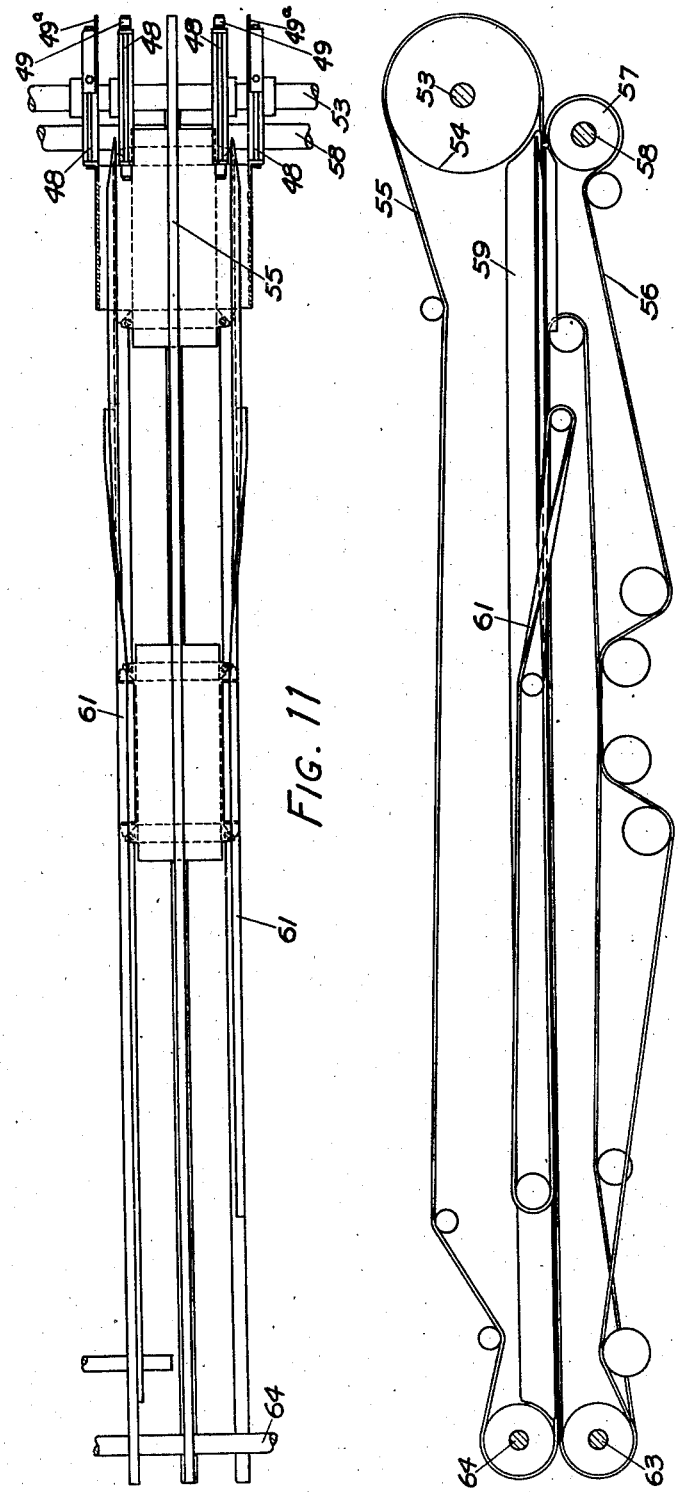

July 16, 1935.　　　　E. G. STAUDE　　　　2,008,049
SHEET FEEDING, FOLDING AND GLUING MECHANISM
Filed Oct. 4, 1934　　　14 Sheets-Sheet 11

INVENTOR
EDWIN G. STAUDE
BY
ATTORNEYS

July 16, 1935.  E. G. STAUDE  2,008,049
SHEET FEEDING, FOLDING AND GLUING MECHANISM
Filed Oct. 4, 1934  14 Sheets-Sheet 12
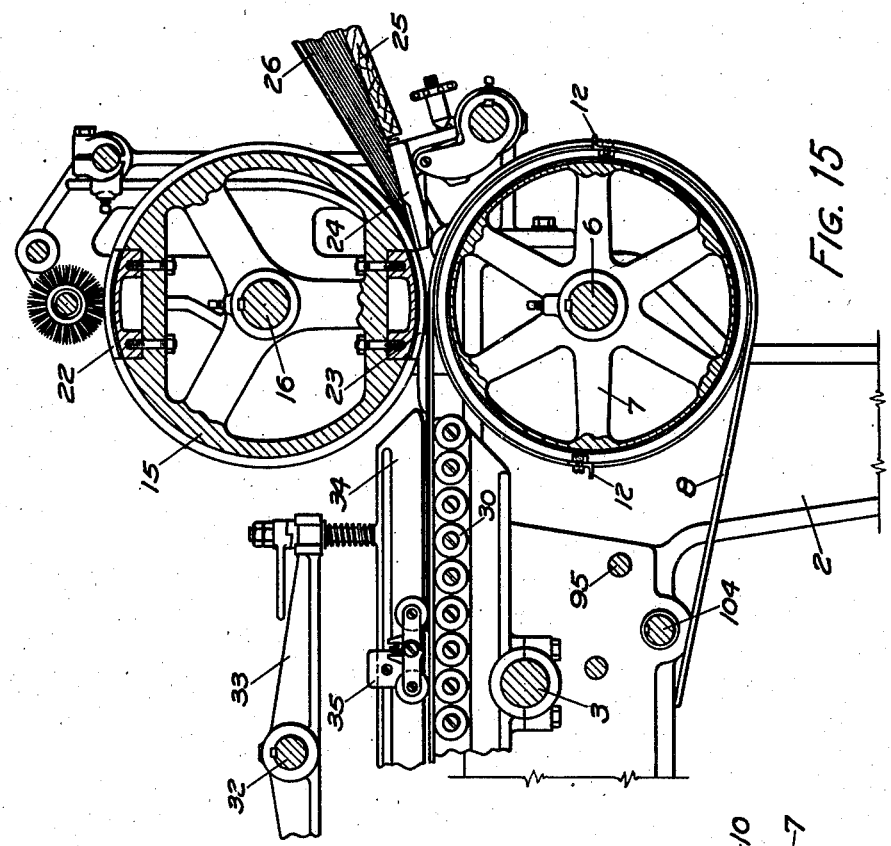
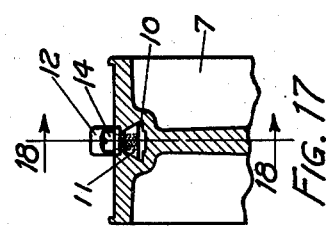
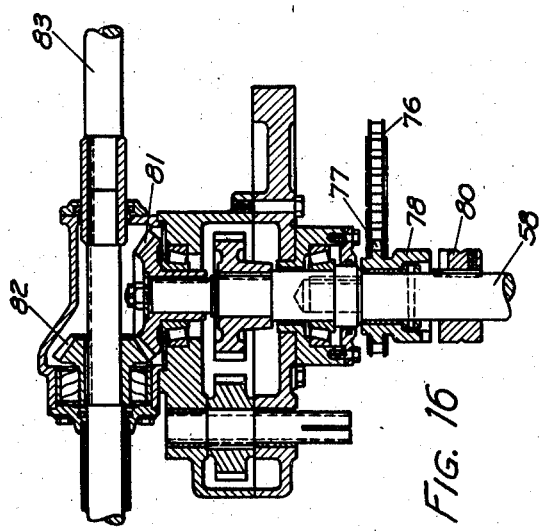
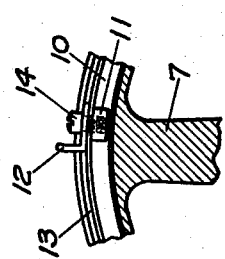
INVENTOR
EDWIN G. STAUDE
ATTORNEYS

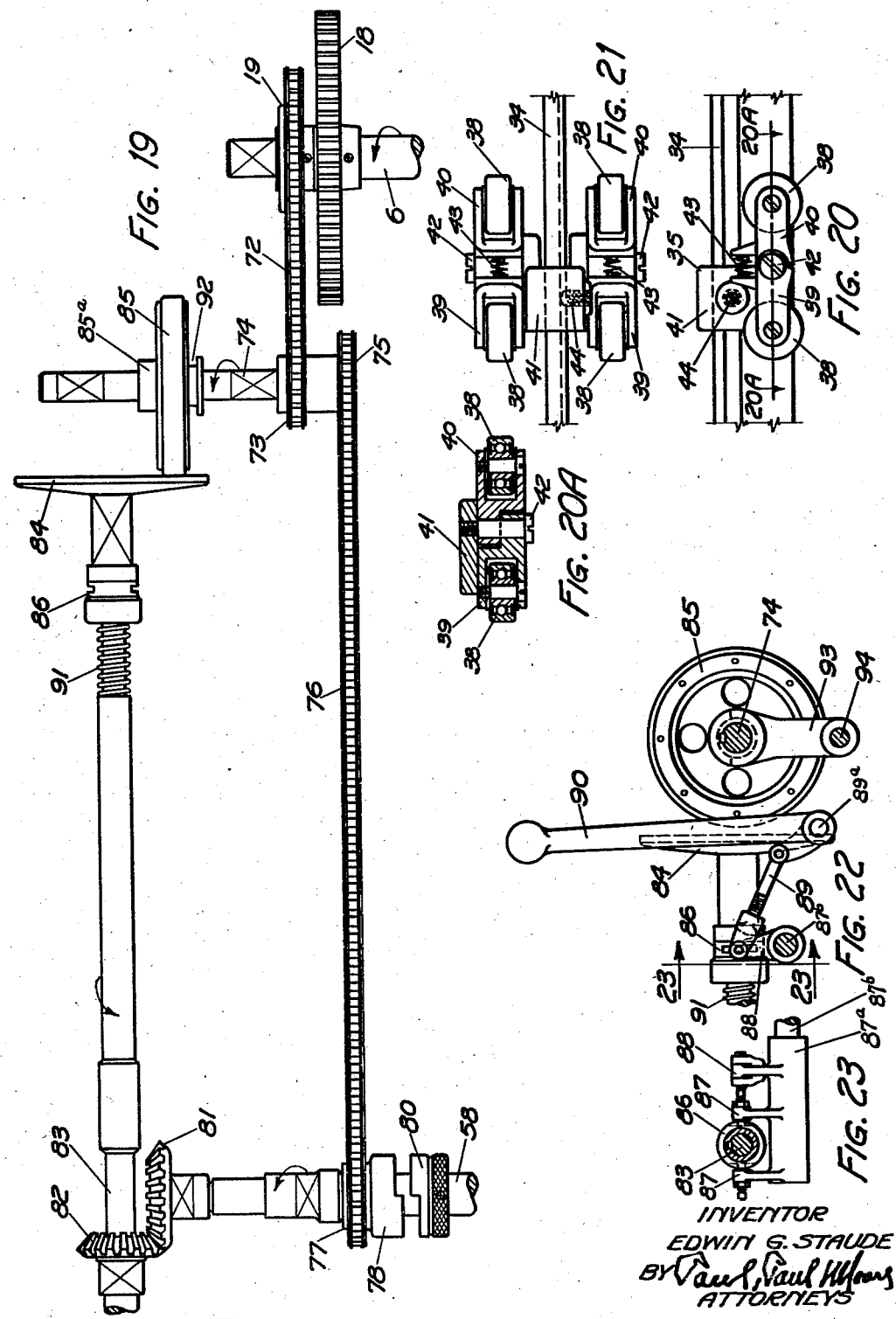

July 16, 1935.   E. G. STAUDE   2,008,049
SHEET FEEDING, FOLDING AND GLUING MECHANISM
Filed Oct. 4, 1934   14 Sheets-Sheet 14
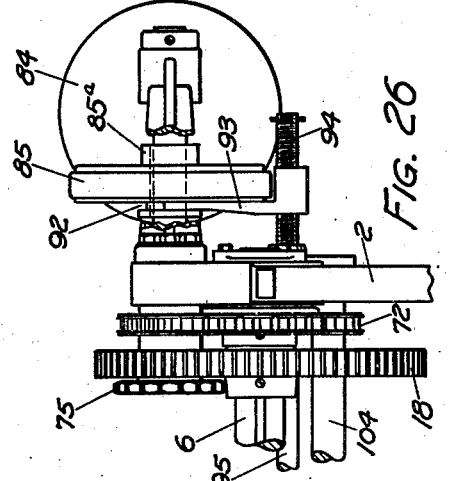
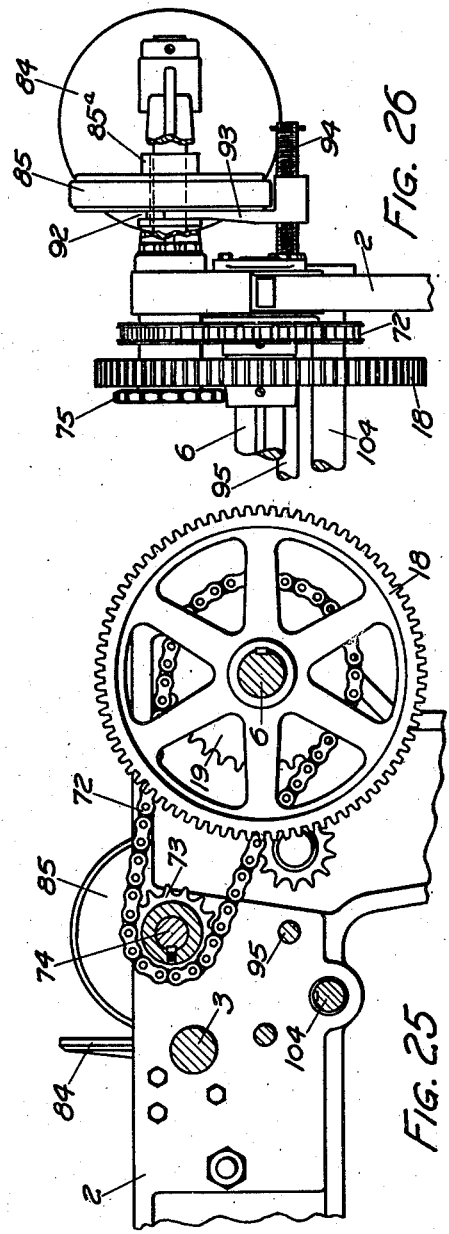
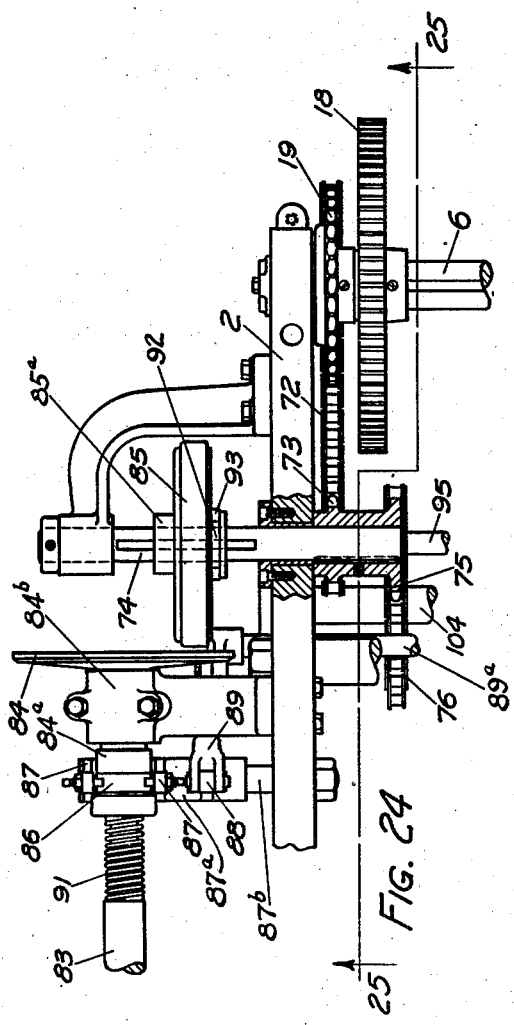
INVENTOR
EDWIN G. STAUDE
BY Paul, Paul & Moore
ATTORNEYS Patented July 16, 1935

2,008,049

UNITED STATES PATENT OFFICE 2,008,049

SHEET FEEDING, FOLDING, AND GLUING MECHANISM

Edwin G. Staude, Minneapolis, Minn.

Application October 4, 1934, Serial No. 746,861

19 Claims. (Cl. 93—49)

This invention relates to improvements in sheet handling machines and finds valuable application for feeding, folding and gluing various types of paper boxes or cartons. There is herein provided a machine adapted for handling a wide range of types of articles, box blanks, etc., and for feeding, folding and gluing the same, at as great a speed as when they are handled by a fast machine designed especially for operating upon particular types of blanks.

The present machine is adapted to handle blanks or sheets of various types, for each of which a separate specially designed machine was previously required. Such special types of machines are described in my Patents No. 1,144,506; No. 1,894,131; No. 1,910,413 and No. 1,921,269.

Heretofore a user had to buy a certain kind of folding and gluing machine, for each type of box or carton to be folded. This resulted in specialization, particularly by smaller concerns, and the buying of a machine particularly designed for folding a certain type or types of cartons, and not usable for folding any other type or types. It thus happened that if the smaller operator with his specially designed machine could not get enough work, his machine would be idle because of his inability to handle work of any other type. The present invention overcomes these objections and provides a machine upon which substantially all classes of work can be handled. Thus by the use of the machine of the present invention, no specialization on particular types is necessary and the machine can be kept in such constant operation as to make it profitable, because if the buyer cannot get a sufficient amount of a particular kind of package to fold, he can bid or contract for folding and gluing other types. The primary object, therefore, of this invention is to produce what I call a multi-purpose machine capable of gluing and folding, at high speed, the various types of folding boxes, or sheets usually handled in up-to-date box folding plants.

Other objects of the invention are: to provide a single machine capable of doing spot-gluing or capable of doing ordinary or non-spot-gluing; to provide a machine having a selective driving means adapted either to synchronize gluing and feeding means for the spot gluing or gumming operation or to simultaneously operate said feeding and gluing means without special synchronization; to provide folding mechanism in association with a secondary feeding means, the folding means being adjustable transversely to line of feed and away from the secondary feeding means to permit independent operation of the latter; to provide primary and secondary feeding means and to have a feeding portion of the secondary feed means adjustable toward and away from the primary feeding means in direction of feed to compensate for the difference in lengths of the fed article in direction of feed; to provide a folding mechanism capable of diagonal folding, and associated with a secondary feeding means for the purpose set forth; to provide a primary and secondary feeding means with means by which the feeding speed of a sheet delivered by the primary feeding means is reduced or by which the sheet is stopped before being operated on by the secondary feeding means; to provide means operable by the primary feeding means and selectively acting to advance the sheet into timed feeding relation with the secondary feeding means; to provide means adapted to fold a blank having a plurality of aligned flaps with means for selectively bending a flap of the blank to a predetermined position in relation to part of the folding means; and to generally provide constructions for carrying out all of the above objects.

Features of the invention include all the details of construction shown or described, along with the broader ideas of means inherent in the disclosure.

Objects, features and advantages of the invention will be set forth in the description of the drawings forming a part of this application, and in said drawings Figure 1 is a plan view showing a mechanism set for timing and spot-gluing the type of blank shown in Figures 32, 33 and 34;

Figure 3 is a vertical longitudinal section taken on line 3—3 of Figure 1, with a machine set for operating on blanks of the type shown in Figure 32, and which require spot-gumming;

Figure 4 is a vertical longitudinal section taken in the same plane as that of Figure 3, but showing the mechanism set for handling that type of box shown in Figure 35 in which no timing for spot-gluing is necessary;

Figure 8 is a vertical cross-section on line 8—8 of Figure 9, further illustrating the diagonal folding mechanism of Figures 2 and 7;

Figure 9 is a vertical longitudinal section on line 9—9 of Figure 8 but with the stationary folding rods omitted;

Figure 10 is a vertical longitudinal section on line 10—10 of Figure 7, showing the relation of the stationary flap selector to other parts of the folding mechanism;

Figure 11 is a somewhat diagrammatic plan of the first folding section for that type of blank shown in Figure 32, which mechanism acts to fold the blank after the application of glue;

Figure 12 is a diagrammatic side view of Figure 11;

Figure 15 is a vertical longitudinal section taken on line 15—15 of Figure 6, further illustrating the primary feeding mechanism;

Figure 16 is a horizontal section of that portion of the selective driving means which operates the gluing mechanism, and which is in part concerned with synchronization of the gluing and feeding means;

Figure 17 is a fragmentary detail section through the lower built driving pulley part of the primary feeding mechanism, illustrating the adjustable abutment timer for kicking the slowed or stopped blank into feeding relation with the secondary feeding mechanism;

Figure 18 is a section on line 18—18 of Figure 17;

Figure 19 is a diagrammatic plan of the dual or selective driving means, with the parts positioned for simultaneous operation of the feeding and gluing means, without special synchonization;

Figure 20 is a view of a detail side elevation showing one of the adjustable trucks as a feeding portion of the secondary feeding means adjustable toward and away from the primary feeding means in direction of feed;

Figure 20A is a section on line 20A—20A of Figure 20;

Figure 21 is a plan of Figure 20;

Figure 22 is a detail of the mechanism for disconnecting the variable speed drive portion of the selective driving means (also see Figure 1);

Figure 23 is a vertical section on line 23—23 of Figure 22;

Figure 24 is a detail plan view partly in section, further illustrating the variable speed drive portion of the selective driving mechanism (which is located at the primary feeder end of the machine) showing the parts set for synchronization of the feeding and gluing means;

Figure 25 is a vertical section on line 25—25 of Figure 24;

Figure 26 is an end elevation of Figure 25;

Figure 27 is a detail plan view of one of the friction devices used to reduce feeding speed of the blank or to stop it (see Figure 7);

Figure 28 is a vertical section on line 28—28 of Figure 27;

Figure 29 shows a box blank of the double wall type, the shaded portions representing the places of application of the adhesive;

Figure 38:
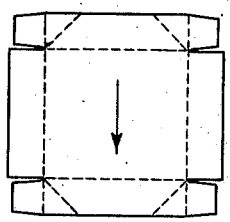
Figure 39:
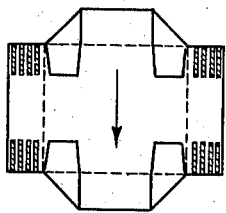
Figure 40:
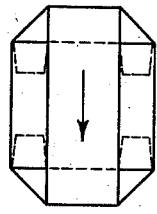

Figures 30 and 31 respectively show the first and second folding operations on the blank of Figure 29;

Figure 32 is a view of a plan of a blank known as a collapsible set-up type. The shaded portions represent places of application of the glue, and include two parallel strips and four spot-gumming points;

Figures 33 and 34 respectively show the first and final folding operations on the blank shown in Figure 32;

Figure 35 is a plan of the ordinary tuck-end carton blank (no timed or spot-gluing required);

Figure 36 shows the adhesive applied to the under side of the blank of Figure 35;

Figure 37 shows the single fold made on the blank of Figure 35;

Figure 38 shows what is known as the diagonal folding box blank;

Figure 39 shows the diagonal flaps of the blank of Figure 38, folded, with the adhesive applied; and Figure 40 shows the blank of Figure 38 after folding.

In the drawings (see Figures 1 and 3), numeral 2 indicates the side frames of the machine, which are held in rigid position by cross members 3. These cross members also serve for slidably mounting parts of a secondary feeding mechanism and parts of a folding mechanism, both described below. The side members 2 are bolted to the frame 4 which supports the gluing and folding mechanisms. These frames 4 have suitable cross members or spreaders 5 tying them together.

Figure 5:
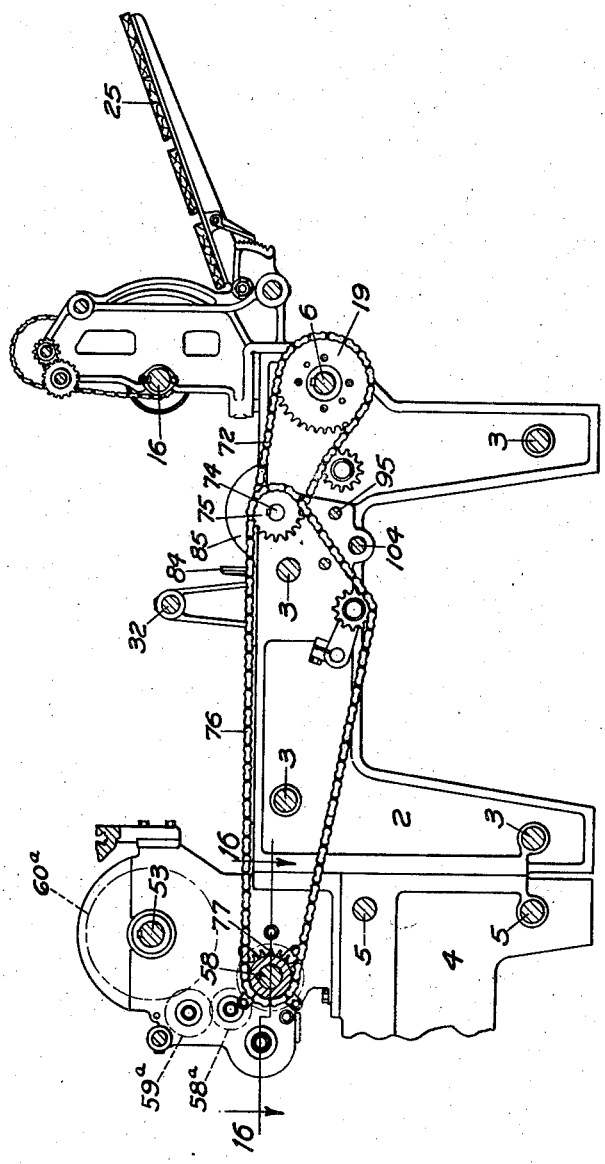
Figure 5 is a vertical longitudinal section taken on line 5—5 of Figure 1, and showing some of the driving connections.

Referring to Figures 6, 15, 17 and 18: At the forward or feed end of the machine is provided a primary feeding mechanism including a lower cross shaft 6, upon which is mounted a pulley 7, which drives feed belts 8 and 9. The pulley 7 is provided with an annular dovetail groove 10, and sliding in this groove is a dovetail nut 11, and associated with this nut is an angle member 12 acting to kick or advance a carton independently of the other parts of the primary feeder. The member is guided and adjustable in an annular groove 13, said member being secured to the nut by a fillister head screw 14. The belts (see Figures 6 and 15) on the pulley 7 are adapted to cooperate with a feed wheel 15 mounted on shaft 16. The shaft 16 is driven by spur gear 17 in mesh with driving spur gear 18 mounted on shaft 6. Shaft 6 is driven by sprocket 19 (see Figures 5 and 19) in a manner below described, and is mounted in suitable bearings 20 and 21.

Referring to Figure 15: The grooved feed wheel 15 is provided with friction surfaces 22 and 23 of blocks, which blocks are removably secured in sockets as shown. These friction surfaces cooperate with adjustable retarding member 24 arranged as shown, and upon which the sheets in the hopper rest. The surfaces 22, 23 and the working surface of device 24 are all preferably made of rubber, but may be made of material of any proper composition. The retarding fixture 24 is substantially a coplanar continuation of the feed board 25. The feed boards have suitable sides 27 and 28 for guiding the blanks toward the primary feeder.

Referring to Figures 3 and 10: It will be seen that the belts 8 and 9 pass over idler pulleys 29, and that their upper runs are operably supported by a series of anti-friction rollers 30, their lower runs passing over a suitable belt tightener mechanism 31. Mounted above the feed belts 8 and 9 is a cross bar 32 supporting an adjustable member 33 arranged in parallel relation to the direction of feed. This member 33 in turn supports a bar 34 also parallel with the line of feed, and upon the bar 34 are mounted a series of carriages, individually generally designated 35. These carriages form an adjustable part of the secondary feeding means, and the carriages can be made to assume any spaced relation with reference to the primary feeder. The bar 34 is spaced sufficiently from the belts 8 and 9 so that when the blank is fed from the pile 26 by feed wheel 15, it can move in perfect freedom between the belt and the bottom surface of the bar 34.

Experience has proven that the timed feed wheel cannot be relied upon to feed the blanks on time accurately enough to obtain proper registration between that area of the blank to be gummed and the spot-gumming elements of the gummer, due to the fact that, when the feed hopper is full, the friction surfaces 22 or 23 will operate or engage farther back on the blank than when the hopper is nearly empty. The feeding interval of the blank is thus so varied as to make accurate timing impossible, resulting in improper registration of the blank with the spot-gluer and even causing the blanks to miss the spotters. To overcome this, there is provided a secondary feeder or carrying mechanism having as a feeding part thereof the above described carriers or trucks adjustable toward or away from the primary feeder conformably to the length of the blank. The truck nearest the primary feeder is the first part of the secondary feeder to act on the blank after being delivered by the primary feeder, and is adjusted in conformity to the length of the blanks being fed.

There is also provided friction means for slowing each blank down or causing it to stop, and I also provide means, the equivalent of 12, to push or kick the blank from this friction means into the secondary feeder and accomplish this by what I call a removable timing mechanism. This mechanism includes members 36 (see Figure 1) which members are yieldably urged toward stationary surfaces 37. By this means the carton is slowed or brought to a complete stop before it assumes feeding relation with the first adjustable carrier 35.

This mechanism takes the place of feed chains with lugs heretofore used, because such lugs would interfere with running types of cartons which do not require timing for spot-gumming. I, therefore, provide a primary feeder for selecting a single blank, and means for slowing it down or stopping it, and then provide means operable by the primary, for pushing the blank into the secondary feeder, on time, and I accomplish this by a device which can be quickly and readily removed.

The blank pushing or kicking is accomplished (see Figure 9) by providing the angle projections 12, which act as abutments to strike the rear edge of the blank to cause its front end to be delivered between the first roller 38 of the first carriage 35 and the belts 8—9. As shown in the drawings the angle elements and the elements 22 and 23 are set to feed two cartons for each revolution of the wheel 15. However, one of the devices 12 and either one of the devices 22 and 23 can be removed to obtain feed of only a single carton at each revolution.

The details of the carriage are shown in Figures 20, 20A and 21. The rollers 38 are mounted in co-acting yokes 39 and 40, one for each yoke, and the yokes are pivotally secured to the casting 41, each pair by a single screw 42. Each pair of yokes is urged by a spring 43, which yieldably presses the rollers against the sheet on the belts. Casting 41 is adjustable along the bar 34 and is secured in adjusted position by a set screw 44. The rollers are preferably mounted in pairs at opposite sides of the member 41 and therefore opposite sides of the bar 34. On narrow work, where the carriages each having four rollers 38, are too wide for the blank being run, one of the screws 42 is removed and the corresponding yokes and rollers removed leaving only one pair of rollers.

Figure 1:
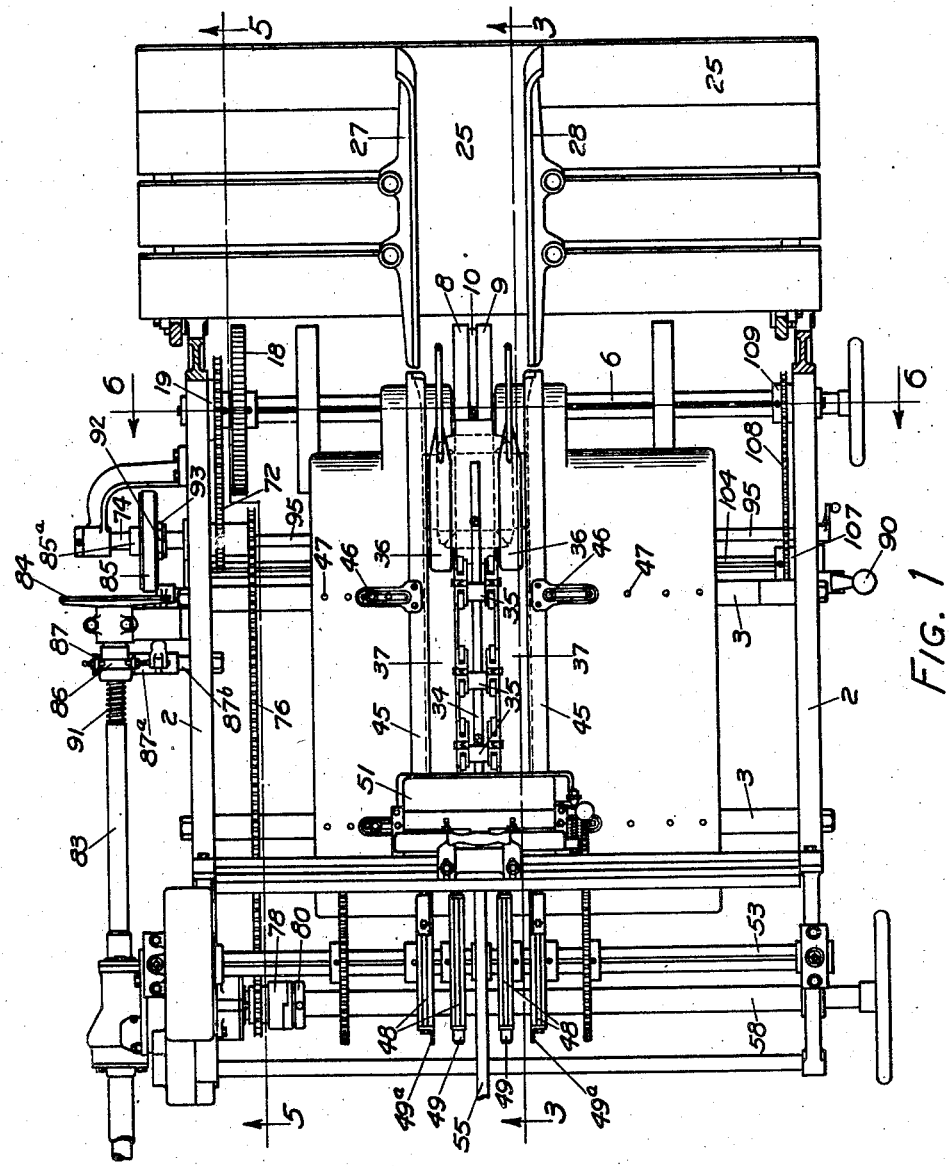
Figure 6:
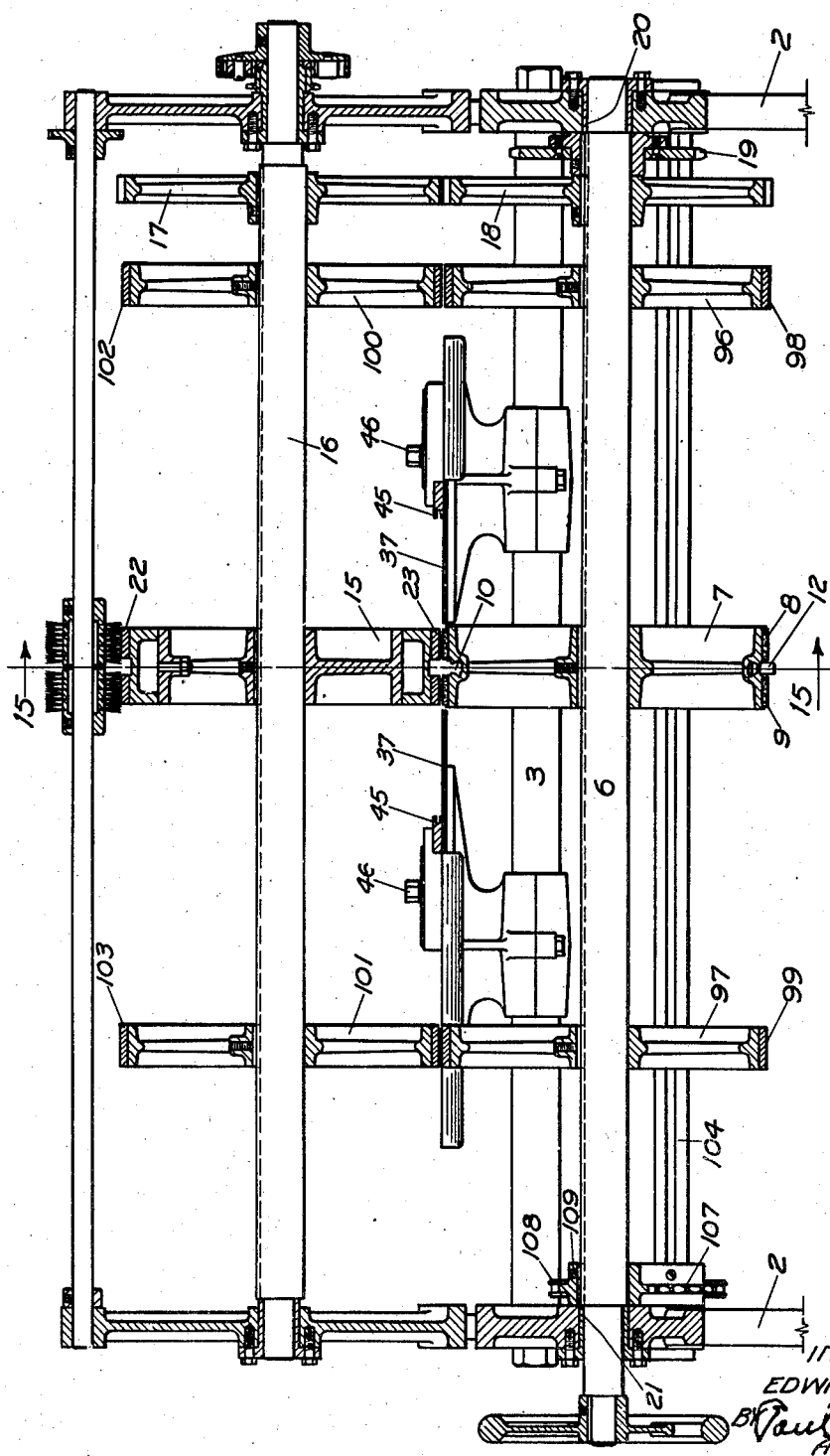
Figure 6 is a vertical cross section through the primary feeding mechanism, taken on line 6—6 of Figure 1.

Referring to Figures 1 and 6: Longitudinal grooved guides 45 are secured by cap screws 46 which screws pass through slots in brackets and enter one of the threaded openings 27 in corresponding plate members 37. Elements 45 act to guide the blanks on each side edge.

*Timing and spot-gumming*

Figure 1 shows the machine set for timing and spot-gumming, and shows that type of blank shown in Figures 32 to 34 positioned in the friction devices 36 as after delivery by the primary feeding mechanism, but as before kicker 12 has acted. The upper feed wheel shaft and mechanism have been removed for the sake of clarity. In this instance, the drive wheel 84 (of the below described synchronizing driving mechanism) is disengaged, as shown in Figure 1, and the clutch 78 (see Figure 16) is engaged with its companion member 80, thus obtaining a synchronized drive between the primary feeder and the gummer.

The blank is fed through the machine (see Figure 3) by the friction action of the belts 8 and 9 and the carriages 35 and is finally delivered to the gumming mechanism generally indicated at 48, and which is shown in Figure 1 as composed, in this instance, of two pairs of wheels, the drum-transfer projections 49, and 49ᵃ and 49ᵇ of which contact with a drum 50 of an adhesive-supplying mechanism 51 of the type described in my Patent No. 1,935,731. The projections are adapted to apply adhesive in outline similar to that shown in the shaded portion of Figure 32. A suitably driven fin roller 52 (Figure 3) holds the blank against the projections to insure even and uniform transfer of the adhesive from said projections to the blank.

Figure 13:
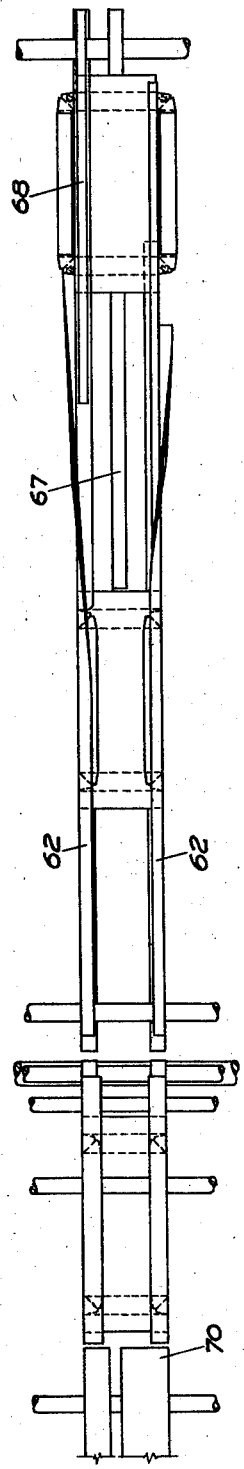
Figure 13 is a diagrammatic plan view of a second folding mechanism to which the folding section of Figures 11 and 12 delivers.
Figure 14:
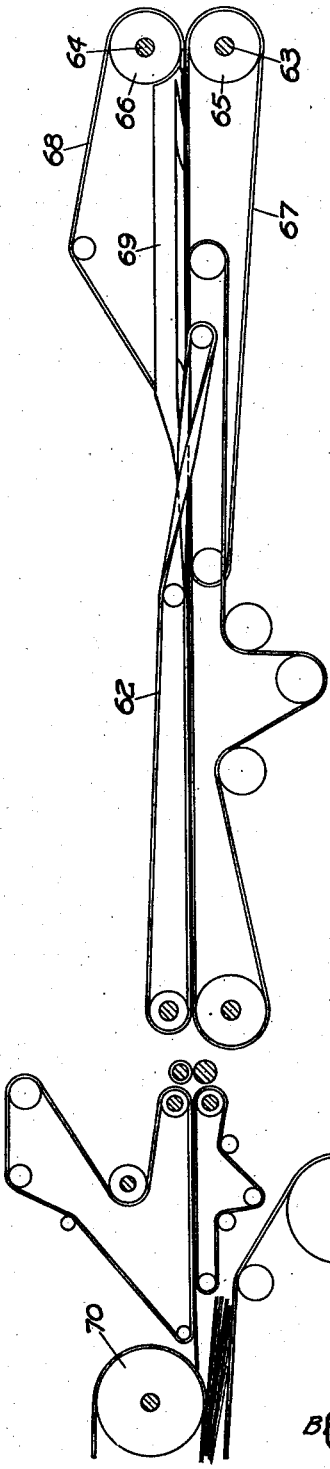
Figure 14 is a diagrammatic elevation of the mechanism of Figure 13.

The adhesive-applying mechanism is mounted on a shaft 53 and each mechanism 48 includes a pair of disks or wheels a pair at each side of pulley 54, which pulley receives belt 55 which belt in turn cooperates with belt 56 (see Figures 3 and 12) driven by pulleys 57 mounted on shaft 58. A suitable pressure carrier 59 bears on the belt 55 and a belt 56 has its upper run supported by anti-friction rollers 60, thus providing the friction drive necessary to advance the now properly gummed blank through the compound folding mechanism. This latter mechanism (see Figures 11 and 12) includes a first section having a first pair of folding belts 61, and a second pair of folding belts 62 (see Figures 13 and 14) in a second folding section which has drive shafts 63 and 64 on which pulleys 65 and 66 are mounted. These pulleys with other suitable pulleys are adapted to receive separate belts 67 and 68. A suitable pressure section 69 (see Figure 14) is provided for assisting and advancing the blank through the second folding section and into the delivery section 70, wherein due to the lower speed of the belt 71, the folded blanks are delivered in overlapped relationship, for removal by the operator at the delivery end of the machine.

Synchronizing drive for feeder and gummer

In order to drive the feed shafts 16 and 6 in synchronization with the gumming mechanism (see Figures 1, 6, 16, 19, 22, 23, 24, 25 and 26), there is provided means including a sprocket chain 72 (Figures 19–24) passing over sprocket wheel 19 keyed to feed shaft 6 and over sprocket wheel 73 keyed to shaft 74. The sprocket 73 integral with a sprocket 75, is connected by sprocket chain 76 with sprocket wheel 77 of the idler clutch member 78 (Figure 16) which under certain conditions turns freely on gummer control shaft 58. Shaft 58 (see Figure 5) drives the glue transfer wheel shaft 53 through a gear train shown in dotted lines, and numbered 58a, 59a and 60a.

The shaft 58 (see Figures 16 and 19) is mounted in suitable bearings and is driven by a bevel gear 81 which in turn is driven by gear 82 mounted on main drive shaft 83. The shaft 83 (Figure 24) at its feeder end is provided with a friction disk 84 contacting the friction wheel 85 fixed on the sleeve 85a which is splined to shaft 74. When the member 78 of Figure 16 is in clutch with a member 80, as when the machine is set for timing, the disk 84 is out of contact with the friction wheel 85. To obtain adjusting movements of the disk 84 toward and away from the disk 85, the disk is mounted on sleeve 84a which is held in bearing 84b and the sleeve is splined (not shown) to shaft 83. The sleeve has a limited translative motion in its bearing, and is provided (Figures 22–23) with an annular groove 86 receiving the ends of the set screws of forked members 87, carried by sleeve 87a which is rockable on a stub shaft 87b attached to the side frame 2. This sleeve 87a is rocked by means including an arm 88, toggle connection 89, shaft 89a, and lever 90, against the tension of spring 91 (see Figures 22 and 24).

In order to adjustably shift and set the speed change friction wheel 85, there is provided in the sleeve 85a an annular groove 92 (see Figure 26). Cooperating with this groove is the fork of an arm 93 having a sleeve in threaded engagement with portion 94 of the setting shaft 95, having a setting handle, see Figure 1. By this device the friction wheel is adjustable, and thus the speed of the primary feeder can be varied.

Ordinary feeding and folding without spot-gumming

I will now describe the mechanism for running ordinary cartons, such as that shown in Figure 35 arranged as shown in Figure 4, and which do not require special timing because spot-gumming is not required. In this case the carton is placed in the feed hopper precisely in the same manner as for the carton of the type of Figure 32, but in this instance the feed wheel 15 (see Figure 16) having the friction surfaces 22 and 23 is moved to one side. The manipulation is as follows: There are wheels 96 and 97 fixed to shaft 6 and these wheels have their peripheries covered with friction material 98—99, preferably of rubber, which co-act with corresponding friction surfaces 102—103 of feed wheels 100—101. The friction surfaces 98—99—102 and 103 are continuous around the surface of the wheel.

If the blank to be fed is cut with a wide panel on the left hand side, the wheel 15 is moved to the left and the kickers 12 are removed from the wheel 7, and the feed wheel 100 is placed in operative relation with wheel 7. The wheel 101 and the wheel 97 are then placed as close to the wheel 102 as possible, provided the blank is large enough. Otherwise the wheel 102 co-acting with wheel 7 will accomplish the continuous feeding, provided, of course, that the kicker 12 is first removed by unscrewing the filister screw 14 and removing the nut 11 through a recess, not shown, but arranged at some point in the annular groove 10, thereby converting the machine into what I call a timeless feeding or driving mechanism. The clutch 78 of the timing mechanism will now be disengaged as shown in Figure 19, and disks 84 and 85 will be in driving contact, as shown in this figure. It is clear that by adjusting the threaded rod 95, the desired feed speed may be obtained for the feeders. The carriages 35 are adjusted as shown in Figure 4 to be closer to the feed wheels.

The mechanism for keeping the surface of the feed wheels free of dirt and lint is in part shown in Figures 3, 4, 10 and 15, over feed wheel 15, but has not been described because the same is fully described in my Patent No. 1,671,687.

Diagonal folding with spot-gumming

Figure 2:
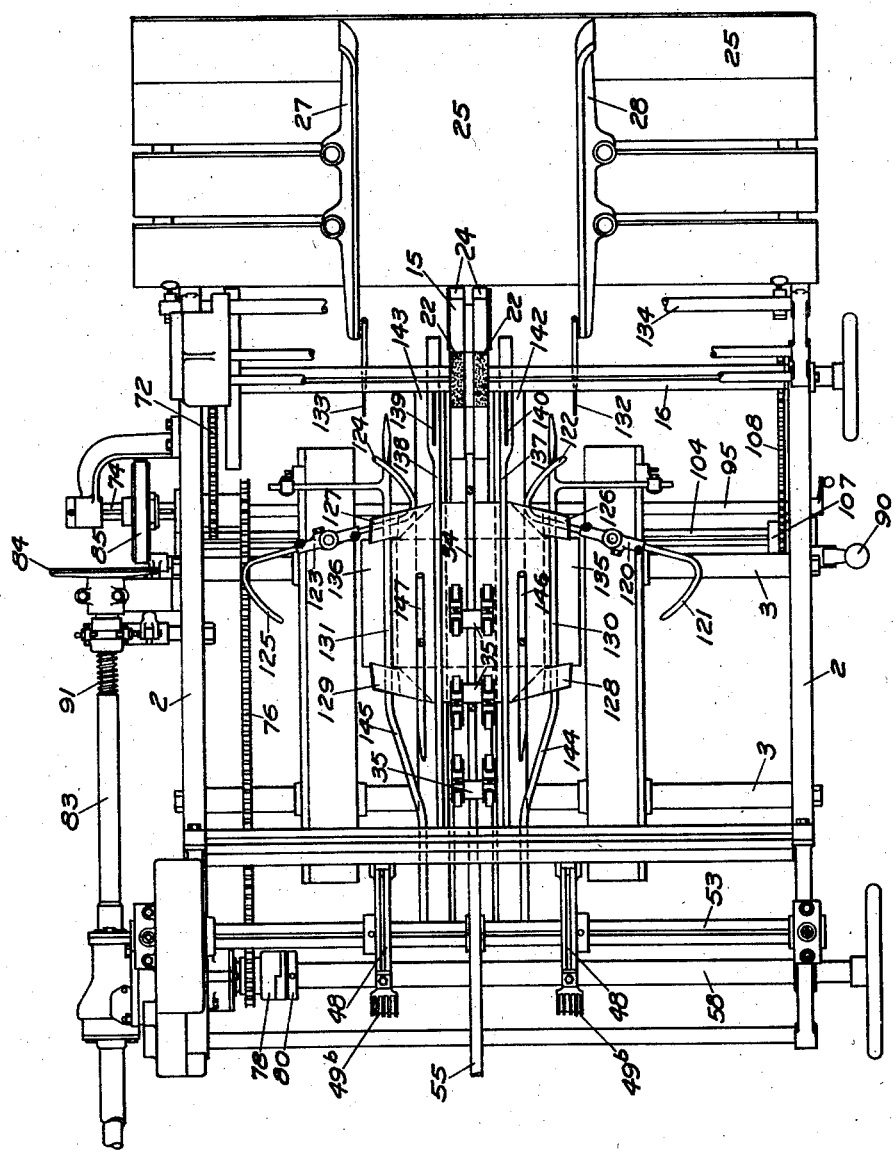
Figure 2 is a plan view similar to Figure 1 showing the mechanism set up for folding a diagonal box, and for timing and spot-gluing the same, this type of blank being shown in Figures 38, 39 and 40.

In order to glue and fold box blanks similar to that shown in Figure 38, the gumming projections are properly set, and the feed wheel and timing driving mechanism is set, as previously described for running the spot-gummed blank shown in Figure 32. Since, however, the blank in Figure 38 has diagonally creased front and rear flaps which have to be folded, I provide a special folding mechanism which is adjustable transversely of the line of feed toward or away from the secondary feeding means, and which can therefore be moved out of operative relation with the secondary feeder, when other types of blanks are to be run. To this end, the machine is provided with a cross-shaft 104 (see Figures 2, 7, 8, 9 and 10). The cross-shaft 104 is mounted (see Figure 8) in bearings 105 and 106 in the side members 2 of the machine frame. Secured to the shaft 104 is a sprocket wheel 107 driven by a sprocket chain 108 (see Figure 2). The sprocket chain 108 is in turn driven by a sprocket 109 keyed to shaft 6 (see Figure 6). The shaft 6 is controlled by the selective driving means. In this instance there is provided, in conjunction with the stationary folding bars, two rotative rear flap folding mechanisms both driven from the shaft 104 in the manner shown in Figure 8, and these revolving elements are so mounted as to be slidable along the frame-connecting shaft 3, toward and away from the secondary feeder. The drive is through bevel gears 110—111 which are splined to the shaft 104 and which are held in mesh with companion gears 116—117 by means of forked members 112 and 113 operating in respective grooves 114—115. Bevel gear 116 is pinned to vertical shaft 118, and a gear 117 is pinned to vertical shaft 119.

Mounted at the top of the shaft 118 above the feeding level is a rotating member 120 provided with folder arms 121 and 122, and the shaft 119 has corresponding members 123, 124 and 125. Mechanism is provided for so timing the arms as to engage (see Figure 7) the rear flaps 126 and 127, and move them inwardly and forwardly as the blank advances, and so position them as to pass beneath and be held under the hold-down rods 146 and 147 in the manner shown for the forwardmost blank of Figure 7.

Another feature of the invention relates to means, herein associated with the primary feeding means, for selectively bending the intermediate flaps 135—136 out of coplanar relation with the other flaps 126—127 and 128—129. In this instance the flaps 135—136 are (see Figure 10) moved downwardly while being advanced by the primary feeder so that they will pass beneath the folding members 130 and 131, while the flaps 126—127 and 128—129 pass above the folding members. These selective deflectors 132—133 are mounted on a transverse shaft 134 and are so placed as to act only on those portions of the flaps 135 and 136 which project slightly beyond the forward and rear flaps of the same side. Since the feed wheel friction members 22 and 23 of feed wheel 15 move the blank forwardly and since there is not sufficient room for the wide friction member 36 (see Figure 1) which are used when running blanks of the type shown in Figure 32, there are provided guide bars 137 and 138, see Figure 8, having slots 139 and 140 (see Figures 27 and 28). Each slot has a spring 141 which bears on the blank, to in turn urge it against the stationary surfaces of the bars 142 and 143.

Figure 7:
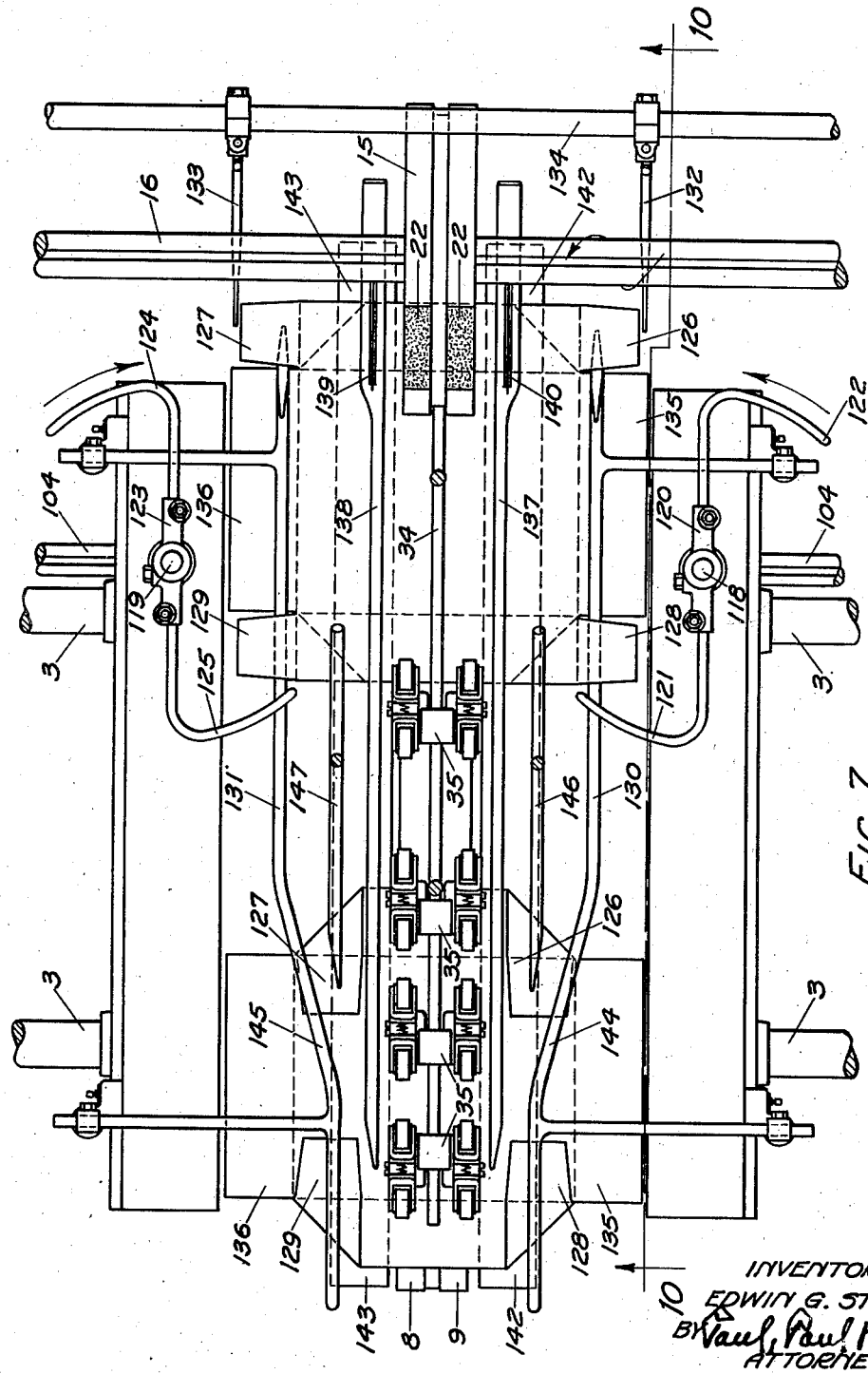
Figure 7 is an enlarged view of the mechanism shown in Figure 2, but with the blank just assuming feeding relation with the secondary feeding means, and adjustable portion thereof.

Referring to Figure 7: As the blank is advanced by the belts 8 and 9 and the carriages 36 (the timing in this instance being identical with that for running the blanks shown in Figure 32) the inclined portions 144 and 145 of the folder bars 130—131 fold the forward diagonal flaps downwardly into the position shown. The rear flaps 126—127 are engaged by the swinging arms 121—122 and 124—125 and folded down so that they will pass down under the hold-down bars 146 and 147. The rear flaps then pass beneath inclined portions 144—145 of bars 130—131. The hold-down bars are secured in any suitable manner preferably by being clamped to the shaft 32 in the manner shown in Figure 10. This particular type of folding means is shown in my Patent No. 1,894,131, but herein forms part of a new combination which makes it possible to fold this particular type of blank on a single machine which will fold other types as well. Although the deflectors for defining the path of the flaps 126, 127, 128 and 129 from the path of the flaps 135 and 136 are quite different, I believe the present construction is a marked improvement over that shown in the previous patent and therefore consider it a feature of this invention.

The bar 34 has been shown suspended from the member 33 (see Figure 10) by studs 148 and 149 slidably passing through openings in bar 33, and springs 150—151 hold the bar in its downward limit position spaced from the feed belts, so that in event of a jam the member 34 can yield upwardly or away from the feed belts. In order to obtain the proper spacing between the member 34 and the belts, suitable jam nuts 152 and 153 are in threaded engagement with the studs 148—149 and provided with cam levers 154 and 155 for raising the studs 148 and 149 and therefore the bar 34, and for locking the bar in raised position, this being accomplished by swinging levers horizontally from the position shown.

Two friction feeding members 22 and 23 have been shown on the feed wheel 15 adapting the wheel to select and deliver two blanks per revolution. For long blanks where it is desired to deliver only one per revolution, one of the friction members is withdrawn and a smooth casting is inserted in its place to obtain continuity of the periphery of the wheel 15 which will then have only one friction surface and will act to feed one blank per revolution. In order to correspondingly time the rear flap folders, when only a single blank is fed per revolution of the feed wheel 15, and with a machine set up for blanks similar to the type shown in Figure 38 (see Figure 7), the revolving members 121 and 125 are removed, so that only members 122 and 124 will function to fold over the pair of rear flaps. One of the angle members 12 is also removed and the other is properly located on the periphery of the pulley 7 to push this single blank into the secondary feeder truck rollers 38 in proper timed relationship, so that the blank will be brought into registration with the gummers. Since the periphery of the gumming members 49, 49ª and 49ᵇ is the same as the outside diameter of the feed wheel 15 and since these members operate in a ratio of one to one, the adhesive applying members are merely located in the proper position on the periphery of the member 48 to apply the adhesive at the proper point or points.

The friction means, which acts before delivery of the blank to the secondary feeder, may act either to substantially reduce the feeding speed of the sheet or blank, or may bring it to a full stop preparatory to its subsequent advance by the kicker abutment into the timed feeding relation with the secondary feeding means, depending upon tension or degree of frictional resistance of the friction means 36 or 141. In some of the claims it is stated that the sheet may be slowed down or may be stopped before being selectively moved by the timer abutments into feeding relation with the secondary feeding means. The intention is to cover both full stopping and slowing without stopping. For example, the friction means may so act as to cause the forward end of the carton to be spaced approximately three-fourths of an inch from the wheel of that truck nearest the primary feeding means and from this position the kicker completes the motion on time to cause the carton to reach feeding relation with the truck and belts. Of course, the carriage of the secondary feeder, the friction means, and the kickers or kicker must be so adjusted that the kicker can push the blank in feeding relation with the truck, and the blank is slowed or stopped so that the kicker can "catch up".

From the foregoing description it will be evident that I have provided a selective or dual drive mechanism operable to run ordinary cartons, not requiring special timing, at what I call timeless variable speeds, or operable (after a change easily and quickly made) to run special cartons which require accurate timing for spot-gluing. The machine is so constructed that all the various mechanisms can be co-ordinated and some can be adjusted or removed when not required for running some particular type of blank. The invention, therefore, combines in a novel manner, and in a single machine, the feeding, folding and gluing mechanisms of a plurality of special machines, and this new machine is capable, as a result of slight adjustments of its parts, of running different types of packages or cartons without the sacrifice of any speed that is obtainable by a machine constructed only for running a single type of package.

When the invention is used for types of blanks not requiring spot-gluing, the variable speed driving mechanism for the primary feeder is used and the blanks are run just far enough apart as not to interfere with one another. For example, I may run four razor blade cartons per foot of travel of the feeding mechanism. Then again, if the blanks are longer, I can quickly adjust the machine to deliver only one blank per lineal foot, since in either case no timing for spot-gumming is necessary. It therefore follows that I can run four times as many razor blade blanks for the same liner speed as, for example, cereal package blanks. To run boxes of the type shown in Figure 29, it is only necessary to add a duplicate folding section so as to accomplish compound folding as in the manner described in my Patent No. 1,123,945. To run boxes of the type shown in Figure 32, there must be, in addition to the compound folding construction, a timed feed for spot-gumming such as that shown in Figures 1 and 2. To run boxes of the type shown in Figure 38, the timed feed for spot-gumming must be combined with rear flap folding mechanism which must include proper adjusting mechanism so that it may be set up as shown in Figure 7.

In the latter two instances (in the blank types Figures 32 and 38) since the blank must be timed to register with the spot-gummer folder mechanisms, the length of the blank does not determine the spacing of the blanks because the blanks must be fed in timed relationship. Therefore, I provide a timed driving mechanism for the feeder, synchronizing it with the secondary feeder and gumming mechanism.

I consider this dual feeder driving mechanism an important feature of the invention because, by its use, ordinary cartons can be run and spaced from one-half to one and one-half inches apart regardless of the length of the blank, by using the timeless variable speed driving mechanism for the feeder, and then I may quickly disconnect the timeless feeder and use the timed drive for the feeder, to feed one or two blanks per revolution of the feed wheel, depending upon the length of the blank and the necessary minimum of spacing required between the blanks, and I can positively handle the blank so that it will always be properly folded and gummed, or gummed and folded.

For the type of blank shown in Figure 35, the lower gluing, and the folding, is usually performed in the second folding section, the first section having the folding mechanism adjusted away from the blank so as not to interfere with the folding of the blank as it is carried through the machine. Whether this carton is folded in the first folding section or in the second is immaterial and depends entirely upon the judgment of the operator, because the gluing arrangement is such that the lower glue pot may be transferred either to the first folding section or to the second.

By the use of the expression "sheet feeding", I do not intend any limitation in regard to the character or quality of the material handled.

I claim as my invention:

1. In a device of the class described, primary sheet feeding means, secondary sheet feeding means to which the primary feeding means delivers, means by which the feeding speed of a sheet delivered by the primary feeding means is reduced or by which the sheet is stopped before being operated on by the secondary feeding means, and means operable by the primary feeding means and selectively acting to advance the sheet into feeding relation with the secondary feeding means.

2. In a device of the class described, primary friction sheet feeding means, secondary sheet feeding means to which the primary feeding means delivers, friction means by which the feeding speed of a sheet delivered by the primary feeding means is reduced or by which the sheet is stopped before being operated on by the secondary feeding means, and abutment means movable with the primary feeding means and acting independently to advance the sheet into operative relation with the secondary feeding means.

3. In a device of the class described, primary sheet feeding means, secondary sheet feeding means to which the primary feeding means delivers including a feeding portion adjustable toward and away from the primary feeding means in direction of feed, means acting on the fed sheet before feeding action by the adjustable portion of said secondary feeding means to substantially reduce its feeding velocity or stop it, and means as part of the primary feeding means but acting selectively to move the sheet against the action of the velocity-reducing or stopping means and cause it to be advanced into feeding relation with the adjustable portion of the secondary feeding means.

4. In a device of the class described primary sheet feeding means, secondary sheet feeding means to which the primary feeding means delivers including a feeding portion adjustable toward and away from the primary feeding means in direction of feed, means acting on the fed sheet before feeding action by the adjustable portion of said secondary feeding means and after feeding action by the primary feeding means to substantially reduce its feeding velocity or stop it and means as part of the primary feeding means but acting selectively to move the sheet against the action of the velocity-reducing or stopping means and cause it to be advanced into feeding relation with the adjustable portion of said secondary feeding means.

5. In a device of the class described, primary friction sheet feeding means, secondary friction sheet feeding means to which the primary feeding means delivers, including a feeding portion adjustable toward and away from said primary feeding means in direction of feed, friction means by which the feeding speed of a sheet delivered by the primary feeding means is reduced, or by which the sheet is stopped before being operated on by the secondary feeding means, and an abutment movable with primary feeding means and abuttingly acting to advance the sheet into feeding relation with the adjustable portion of said secondary feeding means.

6. In a device of the class described, primary friction sheet feeding means, secondary friction sheet feeding means to which the primary feeding means delivers, including a yieldable-pressure feeding part adjustable toward and away from the primary feeding means in direction of feed, stationary friction means acting on the fed sheet to reduce its feeding velocity or to stop it before advancement by the secondary feeding means, and an adjustable abutment as part of the primary feeding means abuttingly acting on the sheet after action of said stationary friction means to kick the article into feeding relation with the feeding means and adjustable part thereof.

7. In a device of the class described, primary sheet feeding means, secondary sheet feeding means to which the primary feeding means delivers including a feeding portion adjustable toward and away from the primary feeding means in direction of feed, gluing mechanism acting on the sheet fed by the secondary feeding means, means acting on the fed sheet before feeding action by the adjustable portion of said secondary feeding means, and adjustable portion thereof to substantially reduce its feeding velocity or stop it and means as part of the primary feeding means but acting selectively to move the sheet against the action of the velocity-reducing or stopping means and cause it to be advanced into feeding relation with the adjustable portion of said secondary feeding means, and selective driving means adapted to synchronize said feeding and gluing means for a spot-gluing operation, or simultaneously operate said feeding and gluing means without synchronization.

8. In a device of the class described primary sheet feeding means, secondary sheet feeding means to which the primary feeding means delivers including a feeding portion adjustable toward and away from the primary feeding means in direction of feed, gluing mechanism acting on the sheet fed by the secondary feeding means, means acting on the fed sheet before feeding action by the adjustable portion of said secondary feeding means to substantially reduce its feeding velocity or stop it, and means as part of the primary feeding means but acting selectively to move the sheet against the action of the velocity-reducing or stopping means and cause it to be advanced into feeding relation with the adjustable portion of said secondary feeding means, primary driving means for simultaneously operating said feeding and gluing means including parts by which the drive for the primary feeding means can be disconnected, and independently acting secondary driving means for synchronizing the actions of the secondary feeding and gluing means when said parts are in disconnecting position.

9. In a device of the class described primary sheet feeding means, secondary sheet feeding means to which the primary feeding means delivers and including a feeding portion adjustable toward and away from the primary feeding means in direction of feed, gluing mechanism acting on the sheet fed by the secondary feeding means, means acting on the fed sheet before feeding action by the adjustable portion of said secondary feeding means to substantially reduce its feeding velocity or stop it, and means as part of the primary feeding means but acting selectively to move the sheet against the action of the velocity-reducing or stopping means and cause it to be advanced into feeding relation with the adjustable portion of said secondary feeding means, primary driving means for simultaneously operating said feeding and gluing means including parts by which the drive for the primary feeding means can be disconnected, and independently acting secondary driving means for synchronizing the actions of the secondary feeding and gluing means when said parts are in disconnecting position, said parts including speed change mechanism for the primary feeding means.

10. In a device of the class described, primary sheet feeding means, secondary sheet feeding means to which the primary feeding means delivers, gluing means to which the secondary feeding means delivers, folding mechanism adapted to fold a blank having a plurality of aligned flaps, while said blank is being fed by said secondary means, said secondary feeding means including a feeding portion adjustable in direction of feed toward and away from the primary feeding means, said folding means being adjustable transversely of the line of feed toward or away from the secondary feeding means to permit the latter to operate independently of the folding means, stationary flap controlling means associated with the primary feeding means for selectively bending an intermediate flap of the blank to a predetermined position in relation to the folding means, means acting on the blank before feeding action by the secondary means to substantially reduce its feeding velocity or to stop it, and means as part of the primary feeding means acting independently to move the blank against the action of the velocity-reducing or stopping means and cause it to be advanced into feeding relation with the adjustable portion of said secondary feeding means.

11. In a device of the class described, primary sheet feeding means, secondary sheet feeding means to which the primary feeding means delivers, gluing means to which the secondary feeding means delivers, mechanism adapted to fold a blank while said blank is being fed by said secondary means, said folding means being adjustable transversely of the line of feed and away from the secondary feeding means to permit the latter to operate independently thereof, means acting on the fed blank before feeding action by the secondary means to substantially reduce its feeding velocity or to stop it, means as part of the primary feeding means acting independently to move the blank against the action of the velocity-reducing or stopping means and cause it to be advanced into feeding relation with said secondary feeding means, and selective driving means adapted either to synchronize said gluing and feeding means for a spot-gluing operation, or simultaneously operate said feeding and gluing means without synchronization.

12. In a device of the class described, primary sheet feeding means, secondary sheet feeding means to which the primary feeding means delivers, gluing means to which the secondary feeding means delivers, folding mechanism adapted to fold a blank having a plurality of aligned flaps while said blank is being fed by said secondary means, said secondary feeding means including a feeding portion adjustable in direction of feed toward and away from the primary feeding means, said folding means being adjustable transversely of the line of feed and away from the secondary feeding means to permit the latter to operate independently thereof, flap controlling means associated with the primary feeding means for selectively bending an intermediate flap of the blank to a predetermined position in relation to the folding means, means acting on the blank before feeding action by the secondary means, to substantially reduce its feeding velocity or to stop it, means as part of the primary feeding means acting independently to move the blank against the action of the velocity-reducing or stopping means and cause it to be advanced into feeding relation with the adjustable portion of said secondary means, and selective driving means adapted either to synchronize said feeding and gluing means for a spot-gluing operation or to simultaneously operate said feeding and gluing means without synchronization.

13. In a device of the class described, primary sheet feeding means, secondary sheet feeding means to which the primary feeding means delivers, and adhesive applying mechanism comprising means for slowing down or stopping the sheet between the primary and secondary feeding means, an adjustable abutment as part of the primary feeding means acting on the rear of the sheet and opposed to the action of the means for slowing down or stopping the sheet and adapted to push the sheet into the secondary feeding means in timed relation with said adhesive applying mechanism, diagonal folding mechanism adapted to fold a blank having a plurality of aligned flaps while said blank is being fed by said secondary means, stationary flap-controlling means associated with the primary feeding means for selectively bending only an intermediate flap of the blank to a predetermined position in relation to the folding means, and means for driving said feeding means.

14. A machine for gluing and folding paper goods, comprising automatic blank feeding mechanism, adhesive applying mechanism, folding mechanism, and delivery mechanism, including dual driving means, one of said means being adapted to drive the primary feeding means in synchronism with the adhesive applying mechanism and the other adapted to drive the primary feeding means at a variable non-synchronized speed with reference to said adhesive applying mechanism, said automatic blank feeding mechanism including a primary and secondary feeding means, means for slowing down or stopping the sheet between the primary and secondary feeding means, said primary feeding means including an adjustable abutment as part of the primary feeding mechanism acting on the rear of the sheet and opposed to the action of the means for slowing down or stopping the sheet, and adapted to push the sheet into the secondary feeding mechanism in timed relation with said adhesive applying mechanism, and selective driving means for synchronizing the blank and adhesive applying mechanisms for the purpose specified.

15. A machine for gluing and folding paper goods, including adhesive applying mechanism, folding mechanism, delivery mechanism and a primary blank feeding mechanism, friction surfaces for slowing down or stopping the blank after it is delivered from the primary blank feeding mechanism, a secondary feeder moving in timed relationship with the primary feeding mechanism for advancing the blank in timed relationship to the adhesive applying mechanism, said secondary feeder being provided with means for adjusting it towards or from the primary feeding mechanism, said primary feeding mechanism including an adjustable abutment as part of the primary feeding means acting on the rear of the sheet and opposed to the action of the means for slowing down or stopping the sheet and adapted to push the sheet into the secondary feeder in timed relation with said adhesive applying mechanism.

16. A machine for gluing and folding paper goods, including adhesive applying mechanism folding mechanism, delivery mechanism, and a primary blank feeding mechanism, friction surfaces for slowing down or stopping the blank after it is delivered from the primary blank feeding mechanism, a secondary feeder moving in timed relationship with the primary feeding mechanism for advancing the blank in timed relationship to the adhesive applying mechanism, said secondary feeder being provided with means for adjusting it towards or from the primary feeding mechanism, said primary feeding mechanism including an adjustable abutment as part of the primary feeding mechanism acting on the rear of the sheet and opposed to the action of the means for slowing down or stopping the sheet and adapted to push the sheet into the secondary feeder means in timed relation with said adhesive applying mechanism, and means for selecting and deflecting a laterally disposed flap of the blank for the purpose specified.

17. A machine for gluing and folding paper goods, including adhesive applying mechanism, folding mechanism, delivery mechanism, and a blank feeding mechanism including primary and secondary feeding means, means for slowing down or stopping the sheet between the primary and secondary feeding means, said primary feeding means including an adjustable abutment as part of the primary feeding means acting on the rear of the sheet and opposed to the action of the means for slowing down or stopping the sheet, and adapted to push the sheet into the secondary feeding means in timed relation with said adhesive applying mechanism, and means for deflecting the longest of a plurality of laterally disposed flaps on a blank for the purpose specified.

18. A machine for gluing and folding paper goods, including an adhesive applying mechanism, folding mechanism, and delivery mechanism, a primary blank feeding mechanism, friction surfaces for slowing down or stopping the blank after it is delivered from the primary blank feeding mechanism, a mechanism moving in timed relationship with the primary feeder for advancing the blank into a secondary feeder or blank carrying mechanism, including an annular grooved wheel mounted below the primary blank feeding mechanism, and having adjustable lugs mounted in said grooves, said lugs being adapted to engage the end of the blank and move same into the secondary feeder.

19. A machine for gluing and folding paper goods, comprising an automatic blank feeding mechanism, adhesive applying mechanism, folding mechanism, and delivery mechanism, including dual drives for the blank feeding mechanism, one of said drives being adapted to drive the feeding mechanism in positive timed relationship with the adhesive applying mechanism, and the other drive being adapted to drive the feeding mechanism at a variable or untimed speed relationship with the adhesive applying mechanism.

EDWIN G. STAUDE.